(12) United States Patent  (10) Patent No.: US 8,160,648 B2
Ulupinar et al.  (45) Date of Patent: Apr. 17, 2012

(54) METHOD AND APPARATUS FOR RECEIVER DIVERSITY CONTROL IN WIRELESS COMMUNICATIONS

(75) Inventors: Fatih Ulupinar, San Diego, CA (US); Gregory A. Breit, San Diego, CA (US); Brian C. Banister, San Diego, CA (US); Edward G. Tiedemann, Jr., Concord, MA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/769,014

(22) Filed: Apr. 28, 2010

(65) Prior Publication Data

US 2010/0210235 A1  Aug. 19, 2010

Related U.S. Application Data

(63) Continuation of application No. 11/073,126, filed on Mar. 4, 2005.

(60) Provisional application No. 60/550,756, filed on Mar. 5, 2004.

(51) Int. Cl.
*H04M 1/00* (2006.01)
(52) U.S. Cl. ............... 455/562.1; 455/132; 455/273; 455/277.2; 455/278.1; 455/303; 375/347; 375/349
(58) Field of Classification Search ............. 455/562.1, 455/133, 277.1, 277.2, 278.1, 303, 273, 132, 455/67.11; 375/349, 347
See application file for complete search history.

(56) References Cited

U.S. PATENT DOCUMENTS

| | | | |
|---|---|---|---|
| 4,823,398 | A | 4/1989 | Hashimoto |
| 5,566,364 | A | 10/1996 | Mizoguchi et al. |
| 5,608,722 | A | 3/1997 | Miller |
| 5,737,327 | A | 4/1998 | Ling et al. |
| 5,742,642 | A | 4/1998 | Fertner |
| 5,771,451 | A | 6/1998 | Takai et al. |
| 5,812,542 | A | 9/1998 | Bruckert et al. |
| 5,903,554 | A | 5/1999 | Saints |
| 5,926,503 | A | 7/1999 | Kelton et al. |
| 5,999,826 | A | 12/1999 | Whinnett |
| 6,009,310 | A | 12/1999 | Motohashi |
| 6,023,615 | A | 2/2000 | Bruckert et al. |
| 6,449,290 | B1 | 9/2002 | Willars et al. |

(Continued)

FOREIGN PATENT DOCUMENTS

DE  4403612  8/1995

(Continued)

OTHER PUBLICATIONS

International Search Report, PCT/US05/007115—International Search Authority—European Patent Office—Feb. 18, 2006.

(Continued)

*Primary Examiner* — Shaima Q Aminzay
(74) *Attorney, Agent, or Firm* — Kenneth Vu; Abdollah Katbab

(57) ABSTRACT

Receiver diversity in a wireless device is controlled in response to operating conditions, transmission requirements, and control settings. The control of diversity reduces power consumption by enabling receive diversity on given conditions. Operating conditions, transmission requirements, and control settings are used separately or used in conjunction to determine whether benefits of multi-antenna receive diversity, such as higher link capacity, higher data throughput, lower transmit power, and lower error rate, warrant the higher power cost of the diversity.

40 Claims, 7 Drawing Sheets

U.S. PATENT DOCUMENTS

| | | |
|---|---|---|
| 6,560,300 B2 | 5/2003 | Mesecher |
| 6,587,696 B1 | 7/2003 | Ma et al. |
| 6,690,944 B1 | 2/2004 | Lee et al. |
| 6,816,709 B2 | 11/2004 | Dickey |
| 6,839,379 B1 | 1/2005 | Horng et al. |
| 6,888,877 B2 | 5/2005 | Doetsch et al. |
| 6,898,446 B2 * | 5/2005 | Muto .................... 455/574 |
| 6,917,820 B2 | 7/2005 | Gore et al. |
| 6,931,050 B1 | 8/2005 | Bottomley |
| 6,947,475 B2 | 9/2005 | Sendonaris et al. |
| 6,965,788 B1 | 11/2005 | Barratt et al. |
| 7,031,741 B2 * | 4/2006 | Lee et al. .................. 455/522 |
| 7,072,628 B2 | 7/2006 | Agashe et al. |
| 7,190,874 B1 | 3/2007 | Barth et al. |
| 2002/0105962 A1 | 8/2002 | Bolgiano et al. |
| 2003/0153358 A1 * | 8/2003 | Moon et al. .................. 455/561 |
| 2003/0190924 A1 * | 10/2003 | Agashe et al. ............... 455/522 |
| 2004/0137930 A1 | 7/2004 | Kim et al. |
| 2004/0146100 A1 | 7/2004 | Chang et al. |
| 2004/0253955 A1 * | 12/2004 | Love et al. .................... 455/442 |
| 2005/0037718 A1 | 2/2005 | Kim et al. |
| 2005/0130597 A1 | 6/2005 | Li et al. |
| 2005/0191978 A1 | 9/2005 | Spencer et al. |
| 2005/0197080 A1 | 9/2005 | Ulupinar et al. |
| 2005/0215287 A1 | 9/2005 | Efland et al. |
| 2006/0002321 A1 | 1/2006 | Han et al. |
| 2006/0009168 A1 | 1/2006 | Khan et al. |
| 2006/0023775 A1 | 2/2006 | Rimini et al. |
| 2006/0056357 A1 | 3/2006 | Payne et al. |
| 2006/0098759 A1 | 5/2006 | Tiedemann, Jr. et al. |

FOREIGN PATENT DOCUMENTS

| | | |
|---|---|---|
| EP | 1324512 | 7/2003 |
| GB | 2347591 | 9/2000 |
| JP | 2003032177 | 1/2003 |
| JP | 2003244056 | 8/2003 |
| RU | 2145152 | 1/2000 |
| RU | 2156033 C2 | 9/2000 |
| RU | 2181229 | 4/2002 |
| WO | WO0159945 | 8/2001 |
| WO | WO0241509 | 5/2002 |
| WO | WO03030403 | 4/2003 |
| WO | WO03088521 | 10/2003 |
| WO | WO2005084379 | 9/2005 |

OTHER PUBLICATIONS

Written Opinion—PCT/US05/007115—International Search Authority—European Patent Office—Feb. 18, 2006.

* cited by examiner

METHOD AND APPARATUS FOR RECEIVER DIVERSITY CONTROL IN WIRELESS COMMUNICATIONS

CLAIM OF PRIORITY UNDER 35 U.S.C. §119

The present application for patent is a continuation of patent application Ser. No. 11/073,126, entitled, "METHOD AND APPARATUS FOR RECEIVER DIVERSITY CONTROL IN WIRELESS COMMUNICATIONS", filed Mar. 4, 2005, currently pending, which claims priority to Provisional Application No. 60/550,756 entitled "METHOD AND APPARATUS FOR RECEIVER DIVERSITY CONTROL IN WIRELESS COMMUNICATIONS" filed Mar. 5, 2004, now expired, assigned to the assignee hereof and hereby expressly incorporated by reference herein.

BACKGROUND

1. Field

The present invention relates generally to wireless communications and more specifically to multi-antenna receive diversity in a wireless communication system.

2. Background

Multi-antenna receive diversity refers to processing multiple received signals in multiple receive chains in a wireless communications device. At least two antennas provide two different input signals to a receiver unit, thereby providing received signal diversity to the communications link. Specifically, the multiple antennas provide spatial diversity as each multi-path appears differently at each antenna. Therefore, the effects of multipath fading are not strongly correlated among the receive paths. As a result, receive diversity improves call and data transmission quality and also increases network capacity.

The outputs of the multiple receiver chains are combined in order to provide a better estimation of the symbols prior to decoding. Combination methods known in the art include, but are not limited to, Minimum Mean Squared Error (MMSE) combining, maximal-ratio combining, equal-gain combining, and selection combining. The main drawback of multi-antenna receive diversity is that each receiver chain expends power, particularly in the Radio Frequency (RF) and analog portions of the chain.

Multi-antenna receive diversity has the ability to increase the forward link capacity significantly. The capacity increase may be capitalized as higher throughput, lower base station transmit power, lower Frame Error Rate (FER), or a combination thereof. One drawback of receive diversity is the power cost of implementing and operating such receivers. In addition, the benefits of receive diversity may not always be utilized or even needed.

There is a need in the art for control methods and apparatuses to use multi-antenna receive diversity when the benefits, such as greater link capacity, higher throughput, lower transmit power, and lower error rate, are available, and not to use multi-antenna receive diversity when the benefits may not justify the higher power cost. Thus, there is a need to control receive diversity to optimize the tradeoff between the benefits of receive diversity and the power consumption of receive diversity in a wireless communications device.

SUMMARY

A mobile device comprises a receiver unit that has at least two receivers to implement multi-antenna receive diversity. A control unit, coupled to control the receivers, generates at least one network capacity indicator that measures allocation of at least one network resource. The control unit also generates at least one quality indicator that measures performance of the traffic link between the mobile and the network. The control unit selectively controls the receiver unit to apply multi-antenna receive diversity mode based on the network capacity indicator and the quality indicator. In one embodiment, a timer unit, coupled to the control unit, enables the receive diversity for a period of time. In another embodiment, the control unit is responsive to input from an application operating on the mobile device. In another embodiment, the control unit monitors state information of the operating state of the mobile device, and controls application of receive diversity based on the state information.

DETAILED DESCRIPTION

Figure 1:
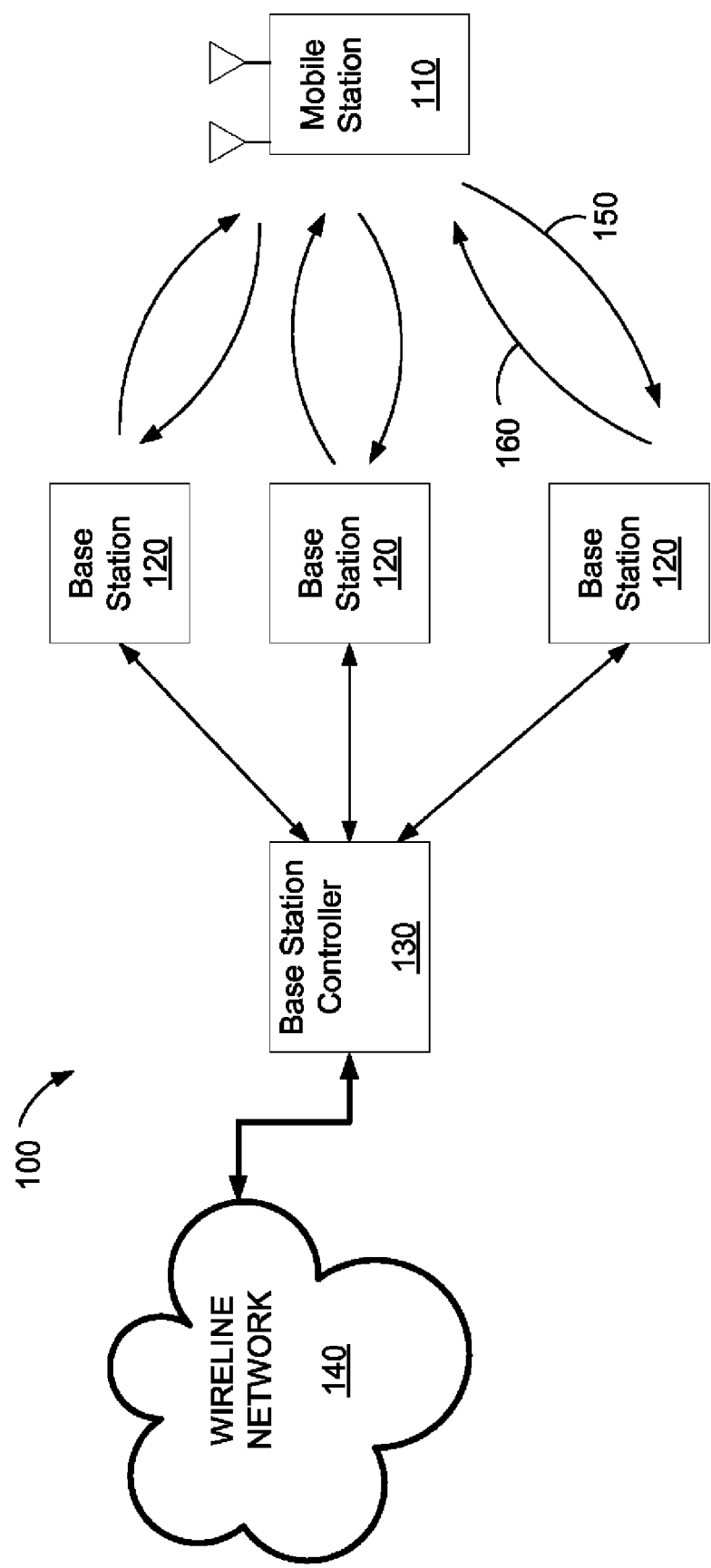
FIG. 1 is an example of a wireless communications network 100 in which multi-antenna receive diversity may be used.

FIG. 1 is an example of a wireless communications network 100 in which multi-antenna receive diversity may be used. A mobile station 110, which may be mobile or stationary, may communicate with one or more base stations 120. A mobile station 110, also referred herein as a "mobile," transmits and receives voice or data or both through one or more base stations 120 connected to a base station controller 130. Base stations 120 and base station controllers 130 are parts of a network called an Access Network. Base station controller 130 connects to wireline network 140. The access network then transports voice or data to and between base stations 120. The access network may be further connected to additional networks outside the access network, such as a wired telephone system, a corporate intranet, or the Internet, all of which may constitute part of the wireline network 140. The access network may transport voice and data between each access mobile station 110 and such outside networks.

A mobile station 110 that has established an active traffic channel connection with one or more base stations 120 is called an active mobile station, and is said to be in a traffic state. A mobile station 110 that is in the process of establishing an active traffic channel connection with one or more base stations 120 is said to be in a connection setup state. The communication link used by the mobile station 110, which sends signals to the base station, is called the reverse link 150. The communication link through that a base station uses to send signals to a mobile station is called the forward link 160.

Multi-antenna receive diversity may increase the forward link capacity of a wireless communications system significantly. Note, throughout this description, the term "receiver diversity" will also be used to refer to "receive diversity." While multi-antenna receive diversity incurs overhead costs, the operating environment of the wireless system may realize a benefit of enabling multi-antenna receive diversity operation over simply operating a single receiver chain. To balance the goals of reduced power usage while taking advantage of the benefits of multi-antenna receive diversity in such environments, it is desirable to control multi-antenna receive diversity operation in a mobile station 110. Multi-antenna receive diversity control would operate to turn off receive diversity when it offers little benefit, and thereby save power, and turn on receive diversity when it would be beneficial.

The presently described embodiments include methods and apparatuses for controlling the application of multi-antenna receive diversity for the purpose of power savings while retaining the benefits of receive diversity when needed. As described herein, multi-antenna receive diversity is controlled in response to operating conditions, transmission requirements, and user settings, among other criteria. The specific condition(s) to enable or disable receive diversity operation depend on the standard under which the mobile is operating as described herein.

The methods described herein for controlling mobile multi-antenna receive diversity are applicable to any wireless communication system, using various multiple access schemes, such as, but not limited to, Code Division-Multiple Access (CDMA), Frequency Division-Multiple Access (FDMA), Orthogonal Frequency Division Multiplexing (OFDM) or Time Division-Multiple Access (TDMA). Examples of CDMA multiple access schemes include but are not limited to TIA/EIA/IS-95, TIA/EIA/IS-2000 or cdma2000, 1xEV-DO, 1xEV-DV, 802.11a, 802.11b, 802.11g, 802.11n, WIMAX, and WCDMA. The embodiments described herein may be used in any wireless system having two or more antennas coupled to two or more operational receivers (i.e., one receiver plus one or more diversity receivers, in the mobile station for a given communication scheme).

Figure 2:
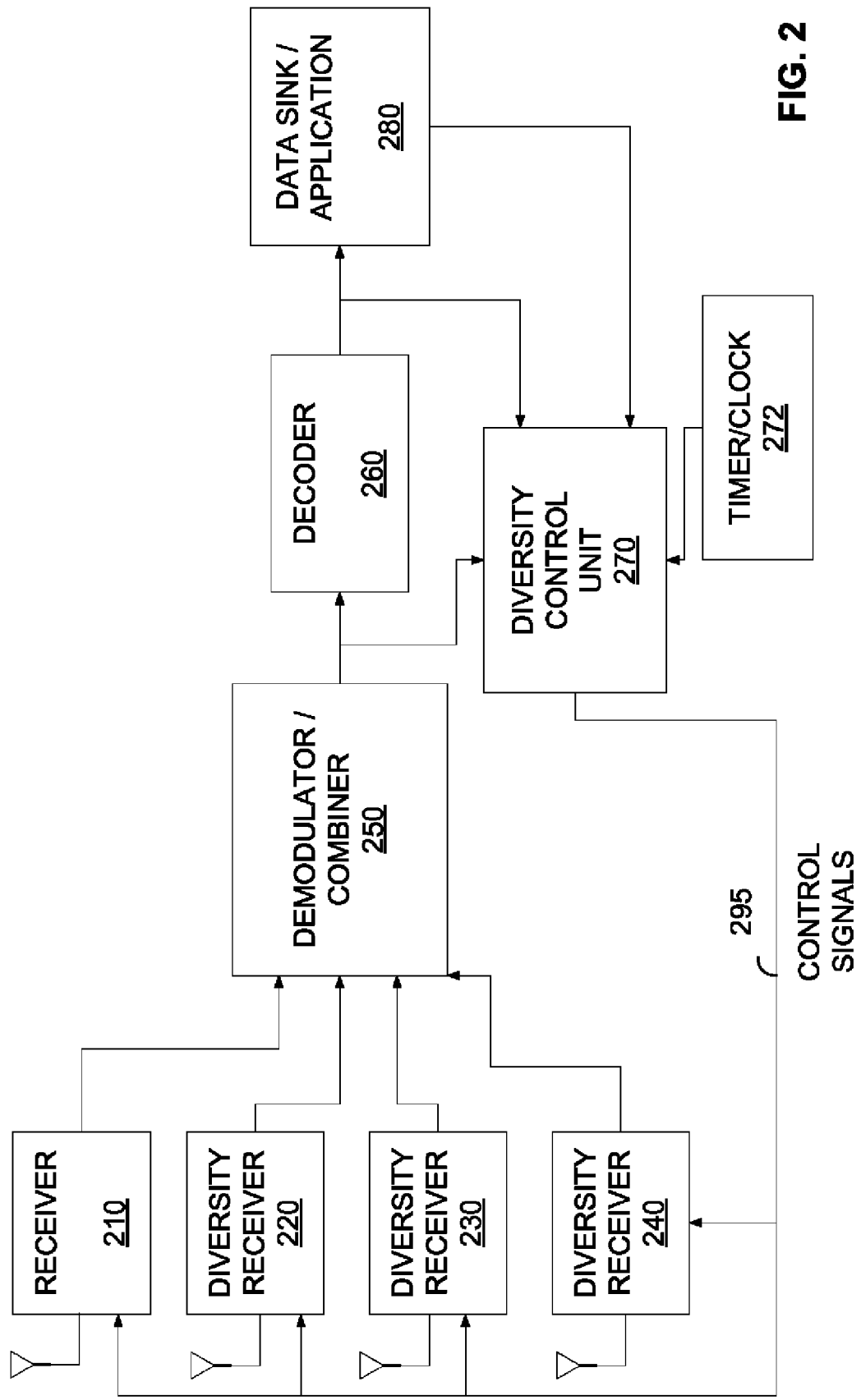
FIG. 2 is a diagram of a portion of the mobile station with two or more antennas and two or more receivers.

FIG. 2 is a diagram of a portion of a mobile 200 with two or more antennas and two or more receivers. Mobile 200 may be similar to mobile station 110 as in FIG. 1. Where specific embodiments described herein are described with respect to a degree of diversity of two, (i.e., two antennas, two receivers, or two receiver chains), such embodiments are described for clarity and are not meant to preclude other degrees of diversity. The invention described herein applies to multi-antenna receive diversity with two or greater antennas and two or greater receivers or two or greater receiver chains. In this disclosure, the term "multi-antenna receive diversity" or "receive diversity" connotes processing two signals received from two different antennas to extract the information (e.g., voice or data) transmitted. The term "receiver" is used to indicate the main receiver chain, as well as portions of a receiver chain in use for receive operations, whether multi-antenna receive diversity is in use at the time or not. The term "diversity receiver" indicates an additional receiver, receiver chain, or portions of an additional receiver chain, which provide diversity when multi-antenna receive diversity is operational. Therefore, a communications device with a degree of diversity of two has two antennas, one receiver plus one diversity receiver. Furthermore, the receiver, the receiver chain, or portions of the receiver chain may be integrated into a single chip, or distributed over multiple chips. Also, the receiver, the receiver chain, or portions of the receiver chain may be integrated into a chip along with other functions of the wireless device.

In one embodiment illustrated in FIG. 2, multi-antenna receive diversity is enabled when one or more diversity receivers (220, 230 or 240) are enabled to operate in conjunction with receiver 210. Receiver 210 and diversity receivers (220, 230, and 240) provide input to Demodulator/Combiner 250. Receiver 210 may include the RF analog front end portions of the receiver, as well as other functions and operations, including RF, analog, demodulation, decoding, and other receiver tasks in any combination. Demodulator/Combiner 250 combines the outputs of receiver 210 and diversity receivers 220-240, and provides output symbols for decoder 260. Note, when multi-antenna receive diversity is disabled, receiver 210 continues to provide outputs to decoder 260. Decoder 260 converts the symbols into bits. The bits are provided to the Data Sink/Application 280.

Diversity control unit 270 receives indicators from the outputs of demodulator/combiner 250 or decoder 260 or both. Diversity control unit 270 also receives other indicators that will be described below. Diversity control unit 270 as shown in the embodiment of FIG. 2 uses both symbols and bits to determine whether to turn multi-antenna receive diversity on or off. Further, diversity control unit 270 uses various other operational conditions and settings separately or in combination. Diversity control unit 270 outputs control signal(s) 295 to diversity receivers 220-240 to control their respective operation. Control signal(s) 295 may be single or multiple signals. Furthermore, control signal(s) 295 may be separate signals to each of diversity receivers 220-240, or may be common signals to all diversity receivers 220-240. Control signal(s) 295 may also be multiplexed, encoded, or formatted using various techniques known in the art.

In one embodiment, a timer or clock 272 may be used to implement a time period for receive diversity operation. The timer 272 may initiate when diversity control is enabled and remain on for a predetermined or dynamically determined time period, after which diversity control is disabled. Note, the timer 272 may be implemented to track diversity control for optimization of the diversity control process. In such a way, the timer 272 would allow the diversity control unit 270 to store the diversity control scenarios of operation, allowing the diversity control unit 270 to predict future operation. For example, the timing information may allow the diversity control unit 270 to adjust the time period after which diversity is disabled.

Figure 3:
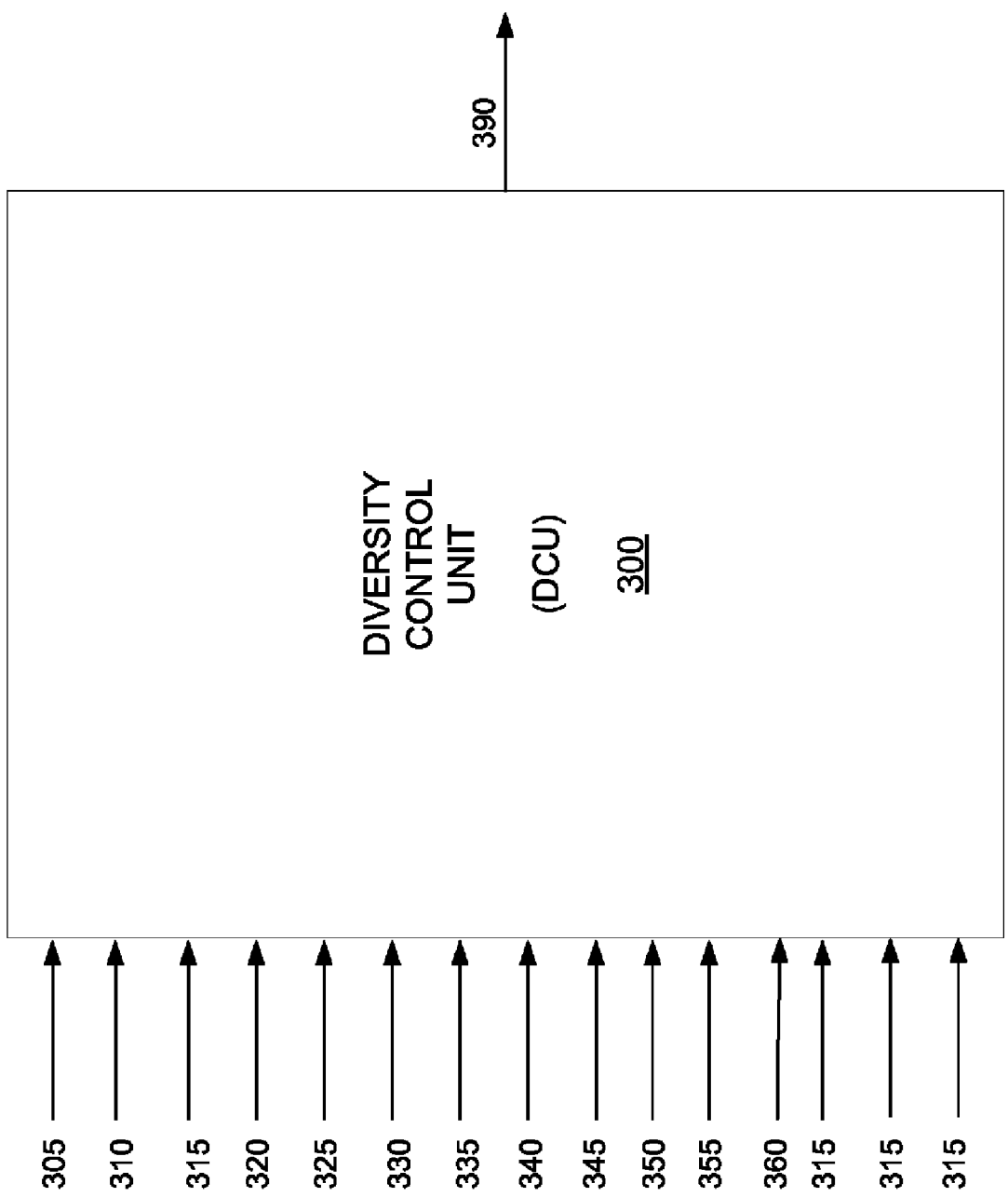
FIG. 3 shows a block diagram of a diversity control unit according to one embodiment.

FIG. 3 shows a block diagram of a Diversity Control Unit 300 according to one embodiment. The methods of diversity control may also be distributed throughout hardware and software. The Diversity Control Unit (DCU) 300 has multiple inputs for indicators, among them channel operating conditions 305, error rates 310, signal strength measurements 315, power control parameters 320 (e.g., power control subchannel), battery level readings 325, Quality of Service requirements 330, application requirements 335, user settings 340, higher layer control 345, transmitter control 350, and pilot channel information 355. Diversity Control Unit 300 outputs Control Signal(s) 390 to the Diversity Receivers, such as receivers 220, 230, 240 illustrated in FIG. 2. Control Signal(s) 390 may be one single signal to all diversity receivers, separate signals to each diversity receiver, or a multiplexed or coded combination of control signals. Furthermore, Diversity Control Unit 390 may operate on any of the indicators individually or in combination. As illustrated, any of the inputs to DCU 300 may be input multiple times, such as signal strength measurements 315.

Figure 4:
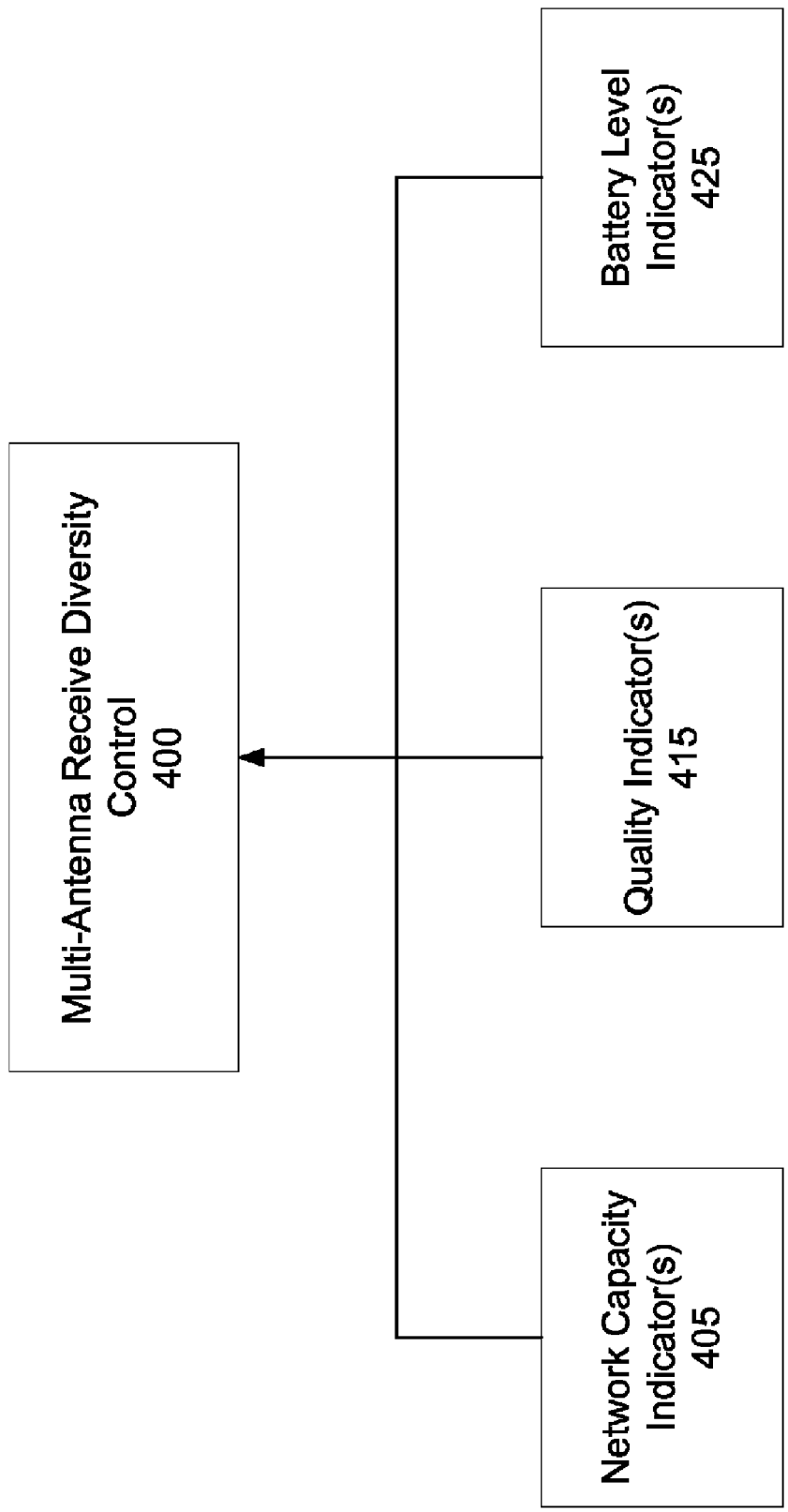
FIG. 4 is a block diagram illustrating multi-antenna receive diversity considerations.

The techniques described herein use one or more indicators to determine whether to turn-on or turn-off multi-antenna receive diversity. FIG. 4 is a block diagram illustrating multi-antenna receive diversity considerations. Multi-antenna receive diversity control 400 receives one or more indicators from network capacity indicator(s) 405, quality (user experience) indicators 415, and/or mobile battery level indicator(s) 425. In some embodiments, network capacity indicator(s) 405 are used to control application of multi-antenna receive diversity. In other embodiments, quality indicator(s) 415, also referred to as user experience, are used to control application of multi-antenna receive diversity. In other embodiments, other considerations, such as mobile battery level indicator(s) 425, are used. In yet other embodiments, various combinations of quality, network capacity, battery level in the mobile and other indicators may be used.

In general, in determining whether to apply multi-antenna receive diversity, two network capacity parameters are considered. One parameter identifies the total amount of resources allocated by the network, and a second parameter identifies the mobile's utilization of the network resources. If the network is not experiencing a high load on the network resources (e.g., transmission power), then the system does benefit from the application of multi-antenna receive diversity. Under this condition, the network has resources to allocate more power to the user. As a result, the system does not benefit from application of multi-antenna receive diversity. As a second network capacity consideration, the mobile turns on multi-antenna receive diversity if the mobile is using a large amount of available capacity. If the mobile is using a small amount of the network's available capacity, then the system does not benefit from application of multi-antenna receive diversity. In one embodiment of a wireless system that transmits voice, both network resource load and mobile utilization of network resources are used to decide whether to turn-on multi-antenna receive diversity. Thus, if a mobile is using a large amount of network capacity and the system can't afford to provide the capacity, then the system benefits from application of multi-antenna receive diversity.

Figure 5:
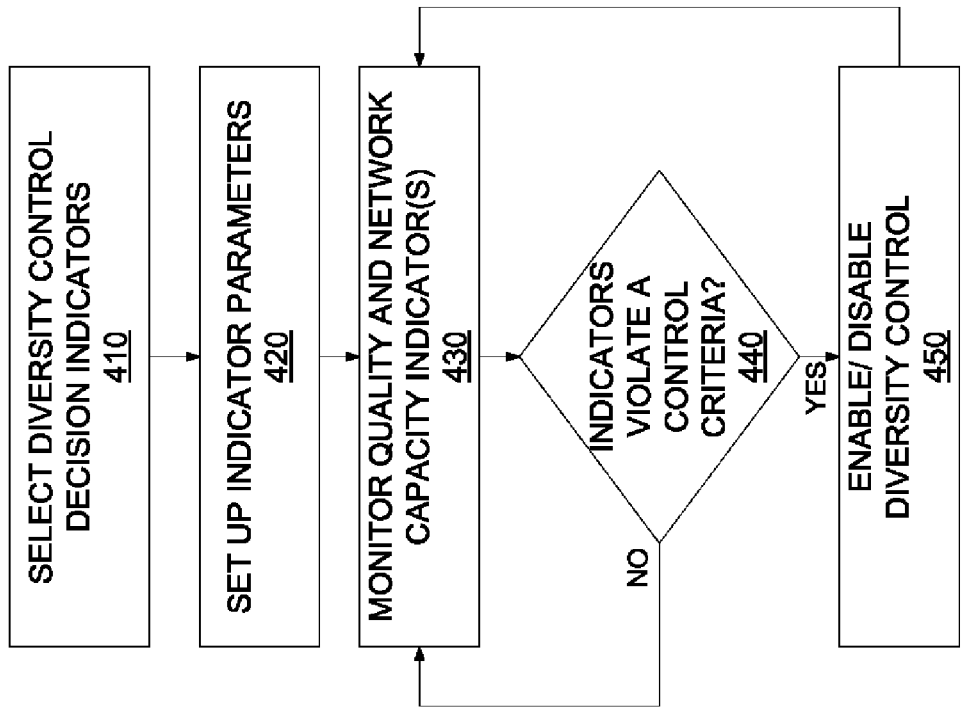
FIG. 5 is a flow diagram for diversity control according to one embodiment.

FIG. 5 is a flow diagram for diversity control according to one embodiment. At step 410, the method selects one or more indicators to use, individually or in combination, for the control decision. Different choices of indicators for various indicators are described below. At step 420, the method sets up the indicator parameters, including choosing the threshold values at which to enable or disable multi-antenna receive diversity. At step 430, the method monitors at least one network capacity indicator and at least one quality indicator during operation of the wireless communications device. At step 440, the method decides whether an indicator, a combination of indicators, a function of an indicator or as combination of indicators violates a diversity control criteria so as to enable or disable the multi-antenna receive diversity. If the indicator does not fall within the range to enable or the range to disable multi-antenna receive diversity, the indicators continue to be monitored at step 430. If the indicator(s) do fall within the range to enable or the range to disable, multi-antenna receive diversity is enabled or disabled at step 450, and the device continues to monitor the indicators at step 430. In one embodiment, the mobile station is configured with selected diversity control decision indicators and parameters. In another embodiment, the mobile station determines these indicators and/or parameters in response to operating conditions.

A wireless device that has established an active traffic channel connection with one or more base stations is said to be in a traffic state. In the traffic state, the wireless device is actively receiving and sending voice or data or both. The diversity control algorithm operation may depend on whether voice or data traffic is used. In data traffic, the algorithms may need to be more aggressive in turning on receive diversity. In one embodiment, this may be achieved by using a different set of thresholds for data than for voice. However, in essence, both voice and data may use similar indicators to control the diversity. In the traffic state, receive diversity is turned on in order to provide extra Forward Link capacity to the system when needed, in order to lower the probability of call drops due to Forward Link loading or due to unfavorable channel conditions, and in order to meet the target FER. All three of these reasons may be highly interrelated. For example, the probability of a call drop is very low as long as the FER target is met. The Forward Link capacity may go down if the base station is required to increase its transmit power in order to decrease the FER.

The mobile station may estimate its forward link power usage and the current load of the sector to decide when the system benefits from the extra capacity that may be provided by multi-antenna receive diversity. The system capacity information is not directly available to the mobile station; however, the mobile station may use the indicators available to it to estimate the capacity of the system. These indicators provide a means for the mobile station to turn on or turn off multi-antenna receive diversity.

A wireless device that is in the process of establishing an active traffic channel connection with one or more base stations is said to be in a connection setup state. The system may benefit from enabling multi-antenna receive diversity when the wireless device is in the connection state.

In one embodiment, the Mobile Station uses Energy per chip per Interference density, given as Ec/Io, or Energy per chip per Noise density, given as Ec/Nt, as indicators. These indicate the ratio of the energy of the pilot to the interference or noise, respectively, as seen by the mobile station; lower values for these ratios indicate that multi-antenna receive diversity would be beneficial because the mobile is receiving less signal energy with respect to interference or noise. Note, Ec/Io is used to determine if the mobile station is within the range of a base station. Because these indicators may fluctuate, a filtering or averaging operation may be performed on these indicators. For example, a Finite Impulse Response (FIR) filter or an Infinite Impulse Response (IIR) filter of these indicators with appropriate time constant may be used.

Another useful quality indicator is the FER of a forward link traffic channel. When the number of errors passes a threshold within a certain time window, multi-antenna receive diversity may be turned on for a specified amount of time or until the FER goes below an acceptable threshold. Multi-antenna receive diversity may be implemented dynamically to achieve a desired FER. Alternatively, an Infinite Impulse Response (IIR) filter may be used in place of the windowing, as follows: $IIR\_FER\_n = IIR\_FER\_(n-1)*A + current\_frame\_status*(1-A)$, wherein, "n" is an iteration index, current_frame_status is 0 for a passed frame and 1 for a frame in error; and A is the time constant of the IIR filter. When the resultant IIR_FER_n exceeds a threshold, multi-antenna receive diversity may be turned on. The IIR implementation provides a computational efficient example; however, an FIR or any other filtering, averaging, or smoothing method may be implemented for multi-antenna receive diversity control.

Multi-antenna receive diversity may be turned off by a variety of means. In one embodiment, multi-antenna receive diversity remains on for a period of time, after which multi-antenna receive diversity is turned off. In an alternate embodiment, multi-antenna receive diversity is turned off based on a given criteria, such as FER below a "turn off" threshold. Note, using an FER indicator for other channels may result in different threshold values, as each channel may have a different acceptable FER.

In addition to FER, the diversity control may be in response to any of the various instantaneous errors and error rates known in the art. Furthermore, any of these instantaneous errors or error rates may be used in isolation or in conjunction with any of the other instantaneous errors or error rates. Therefore, multi-antenna receive diversity control may be responsive to frame errors, message errors, bit errors, symbol errors, higher-level packet errors, and burst errors. For example, the symbol error rate may be calculated before Viterbi or turbo decoding of the channels. This may be accomplished by re-encoding the decoded bits into symbols and comparing these recoded symbols to received symbols. Smoothing and filtering methods described as above may be used on the error rate of the symbols, as well as any other instantaneous error or error rate.

The method for the FER in the traffic channel may also be extended to other channels. For example, the instantaneous frame errors or FER of control channels such as the Forward Dedicated Control Channel (F_DCCH) in the cdma2000 channel may be used to determine multi-antenna receive diversity operation. Similar filtering processes may be used as described above. Furthermore, instantaneous frame errors or FER of additional traffic channels, such as the Forward Supplemental Channel (F_SCH) in cdma2000, may be used to determine multi-antenna receive diversity.

Alternate embodiments may implement other indicators; for example, one embodiment incorporates an estimate of forward power utilization as network capacity indicator(s). In this embodiment, the mobile station estimates a proportion of power allocated to a forward link data channel targeted to the mobile station. The estimate of forward link power may be referenced to the total forward link power, which may consider only power allocated to the specific mobile station or may include measures of power to other mobile stations. The power calculation may be referenced to a known reference signal such as a pilot or training sequence. For example, the indicator may incorporate an estimate of traffic channel power to pilot channel power. A diversity control algorithm may then turn on receive diversity when a metric exceeds a given threshold and turn off diversity when the metric falls below a given threshold.

In an alternate embodiment, an estimate of forward channel quality is used as a receive diversity control indicator. In this embodiment, the forward channel quality is derived from a known reference signal such as a pilot or training sequence.

In still another embodiment, an estimate of forward channel quality is used as an indicator, wherein that forward channel quality is derived from an estimate of the signal to noise of a demodulated reference signal such as a pilot or training sequence. Specifically, this embodiment may apply an estimate of noise power to pilot channel power. Again, the diversity control algorithm may turn on diversity when a metric exceeds a given threshold and turn off diversity when the metric falls below a given threshold.

Many wireless standards, such as cdma2000, use power control to modulate the transmit power of the Mobile Station and the Base Station in order to meet target performance criteria under varying operating conditions, while providing for increased network capacity. In one embodiment, the Diversity Control Unit 270 uses the set point of the Forward Link outer loop power control to derive an indicator. The outer loop power control setpoint, typically given as Energy per bit per Noise energy or as Eb/No, provides a given requirement at the receiver for the Mobile Station to establish as a target for the Forward Link in order to meet the FER requirements. A high value of the Forward Link power control set point indicates the mobile is in need of a higher Eb/No to achieve the target FER. The Mobile Station may benefit from multi-antenna receive diversity in such cases because the combining of two or more receive chains reduces the amount of required Signal-to-Noise Ratio (SNR) at the receiver.

Diversity control may also use the Forward Link inner power control decisions. The inner power control decisions involve commands sent by the Mobile Station to the Base Station to lower or increase the Forward Link traffic channel power to meet the Eb/No setpoint at the Mobile Station. A down command is used to lower the power, and an up command is used to increase the power. These commands should have a zero mean over a reasonably long time frame. If the mean deviates from zero in the up direction, it is an indication of the Base Station's inability to compensate for environmental conditions. This indicator is particularly useful, because a string of up commands not only indicates that the Mobile Station needs more power but that the Base Station is unable to provide more power because the Forward Link traffic channel power allocated to the mobile is at a maximum or because the sector of the Base Station has run out of total power capacity. Both of these conditions indicate the need for multi-antenna receive diversity in order to reduce the system load on the Forward Link.

For this embodiment, the system uses fast forward power bits as an indicator to turn-on or turn-off receiver diversity. If the mobile device is sending a large percentage of down commands (i.e., commands to lower the forward link power), this indicates that the network is allocating a minimum amount of power to the mobile. Under this scenario, receiver diversity is turned-off since the network does not benefit from activation of receiver diversity. In one embodiment, the mobile may turn-off receiver diversity when a certain percent of the power commands are down commands.

Similarly, the diversity control may use the Reverse Link Power Control setpoints or decisions. The Reverse Link Power Control setpoints and decisions is correlated to the channel operating conditions on the Forward Link. The Reverse Link power control commands are sent to the Mobile Station periodically and may be used in the control decision for diversity.

In an alternative embodiment, diversity control may also use the differences (or the FIR or IIR filter of the differences) between current set point of the forward link outer loop power control and the received estimated signal to noise ratio from the Base Station. The difference should have a zero mean over a reasonably long time frame. If this deviates from zero in the direction that set point is higher than received Eb/No, it is an indication of a system's inability to compensate for environmental conditions.

The diversity control may use, as an indicator, the number of pilots in the active set. A higher number of pilots may indicate a more cluttered environment and thus increase the probability of future error. This indicator may be used directly to control multi-antenna receive diversity, or it may be used to change the thresholds for other indicators, such as Ec/Io above.

Furthermore, the number of pilots the searcher finds, which are not being demodulated, add to the interference of the system without being utilized by the coherent demodulation of the fingers. Like the previous indicator, this may be used directly or may be used to change the threshold for another indicator.

An increase in the number of pilots in the active set may also benefit from turning on multi-antenna receive diversity for a brief period of time during which the active set size is increased. This may help the call quality.

The diversity control may also respond to the specific requirements of the application or user. For example, certain streaming video or multimedia applications may require a higher data rate, lower latency, constant bit rate in combination with low error. Also bursty applications, such as web browsing or FTP download, may continuously benefit from receive diversity by enabling higher transmission rates. Diversity control may be enabled for such applications using higher layer control from the application layer or using a user setting.

Such higher layer control may also originate from the transmitter. The transmitter knows beforehand the data payload requirements. The higher layer control may be exercised through the various methods to send control signals known in the art, whether through a traffic channel or a control channel. In another embodiment, the transmitter may control multi-antenna receive diversity at the physical layer.

Such application requirements may coincide with Quality-of-Service requirements. The application or the customer may require certain performance requirements such as low latency, low error, or high-speed. The diversity control may be responsive to these requirements in particular embodiments.

Yet in another embodiment, the receive diversity control decision may be made in response to a battery reading. Specifically, measurements of the current level or the energy level of the battery may indicate the need to save power. When the battery charge is relatively full, there may be a lower threshold for the other indicators to activate multi-antenna receive diversity. Lower battery levels may result in a higher threshold to activate receive diversity, or indicate that receive diversity should be turned off.

In one embodiment, multi-antenna receive diversity is turned on upon receipt of a physical layer packet. Simultaneously, a timer is set. For every successive packet that is received, the timer is reset. When the timer expires, receive diversity is turned off. This procedure may simplify the task of monitoring the control of receive diversity without explicitly identifying the driving application, while ensuring that the multi-antenna receive diversity is enabled for packet data.

Figure 6:
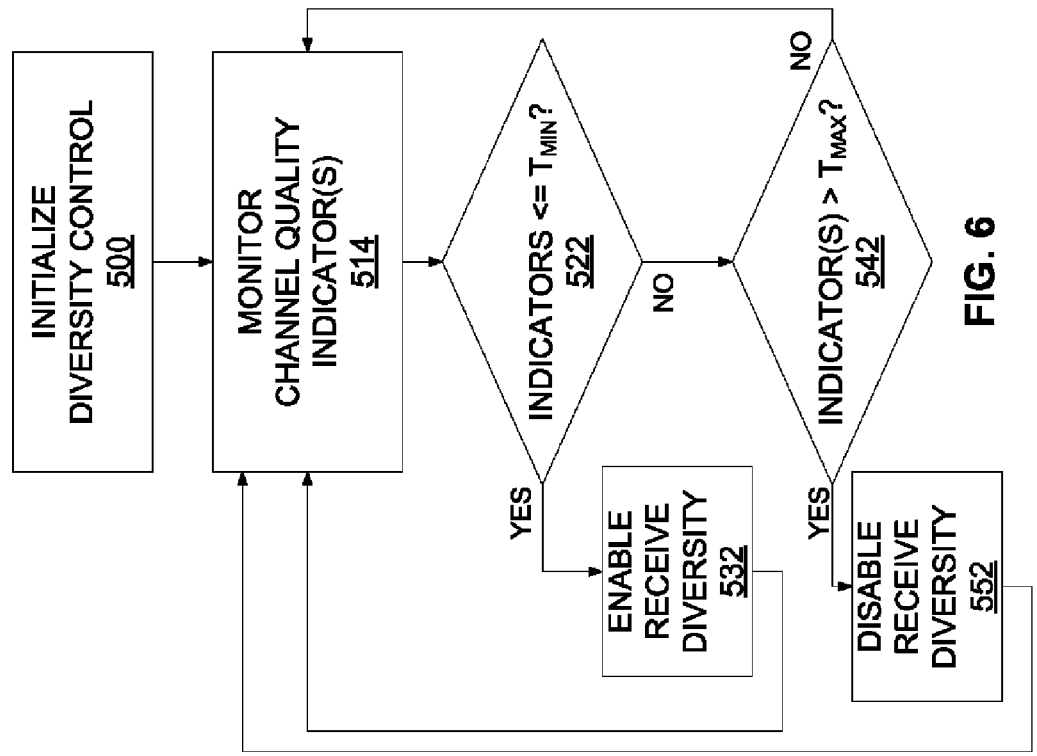
FIG. 6 is a flow diagram illustrating one embodiment for applying multi-antenna receive diversity.

FIG. 6 is a flow diagram illustrating one embodiment for applying multi-antenna receive diversity. All of the indicators used in receive diversity control may benefit from the control process shown in FIG. 6. The control process maintains two thresholds, $T_{min}$ and $T_{max}$. An indicator that signals the need for diversity in lower values, such as Ec/Io, is used as an example. At step 500, the process initializes the diversity control state as on or off. At step 514, the process sets up and monitors the indicator or a combination of indicators. At step 522, the process compares the indicator to $T_{min}$. When the indicator is less than or equal to $T_{min}$, the diversity is turned on at step 532. If the indicator is less than $T_{min}$, at step 542 the process monitors the indicator. If the indicator is greater than $T_{max}$ at Step 542, diversity is disabled or continues in the disabled mode at Step 552. The thresholds may be adjusted depending on environmental conditions such as the speed of the mobile station. The speed of the mobile station may be estimated using the fading frequency of the paths or other indicators. For an indicator signaling, the need for diversity in higher values, such as FER, the roles of $T_{min}$ and $T_{max}$ may be switched. Maintaining separate thresholds for the enabling and the disabling of diversity control eliminates the possibility that certain operating conditions and variations will result in the continuous switching on and off of multi-antenna receive diversity.

In another embodiment, multi-antenna receive diversity, when turned on, may be forced to stay on for a minimum amount of time, irrespective of the state of the observed indicators. This would prevent toggling receive diversity on and off too fast. Fast toggling of receive diversity on and off may be detrimental to the system. The minimum time duration may be constant or may vary depending on one or more of the indicators.

Two or more of the above indicators may be combined to provide a better or more timely decision to control receive diversity. For example, current frame error and current Ec/Io measurements may be used in combination to control diversity. Any of the indicators used for receive diversity control may be used in isolation or in combination with other indicators.

Alternatively, some indicators may be used to adjust the thresholds for other indicators. For example, the number of pilots in the active set may be used to adjust the threshold used for the FER as follows:

$$\text{Threshold\_for\_FER} = \begin{cases} \text{high} & \text{if } \#ofPilots = 1 \\ \text{med} & \text{if } \#ofPilots = 2 \\ \text{low} & \text{if } \#ofPilots \geq 3 \end{cases}$$

The control of multi-antenna receive diversity may be more complex than a simple turn on or turn off decision. For example, receive diversity control may use a multivalued threshold function to turn on or off a subset of multiple diversity receivers depending on the value of the indicators or a function of the indicators. In other words, a specific embodiment of diversity control may be configured wherein not all of the diversity receivers are turned on or off at once. Turning on or off a subset of multiple diversity receivers allows a finer tradeoff between the benefits of receiver diversity and power consumption.

Yet another embodiment of diversity control may control the tradeoff between receiver diversity and power consumption by controlling the power consumption of a diversity receiver itself. For example, by tuning the current supply to the RF and analog components in a diversity receiver chain, the linearity or sensitivity of the diversity receiver may be traded off for the power consumption in that chain.

Another embodiment of multi-antenna receive diversity control is used with 1x EvDO. In 1x EvDO, the mobile may be in one of two states: Idle State or Connected State. In the Idle State, the mobile has an active session with the Base Station but is not in communication with the Base Station. It only decodes the Control Channel messages. In the Connected State, the Mobile Station is in active connection with the Base Station and is under the Base Station power control.

In Idle state, the mobile station has an active session but is not in communication with the base station, and therefore, the mobile station only monitors control or overhead messages. In this state, the mobile station may enter sleep mode for a duration of time. The duration of sleep time may be defined by a standard or specification to support a specific protocol. The duration of sleep time may be indicated to the mobile station by the base station. In the Idle state, the mobile station may turn on diversity to lower the message error rate of the Control Channel messages. The mobile station may use the following indicators to control the diversity operation in the Idle State:

1) instantaneous frame error of the control messages; or 2) channel quality measure of the Forward Link (FL). In the first instance, if one or more errors are detected in a given window of time, diversity may be turned on for a tunable number of consecutive control messages. In one embodiment, control messages are transmitted on a Control Channel. Note, diversity control may be implemented to reduce the FER of other overhead channels. When diversity control uses the Ec/Io or Ec/Nt or SINR estimates of the mobile station, these indicators may experience large variations. Hence an FIR or IIR filtered version of these indicators may be used with appropriate time constants or window sizes.

Figure 7:
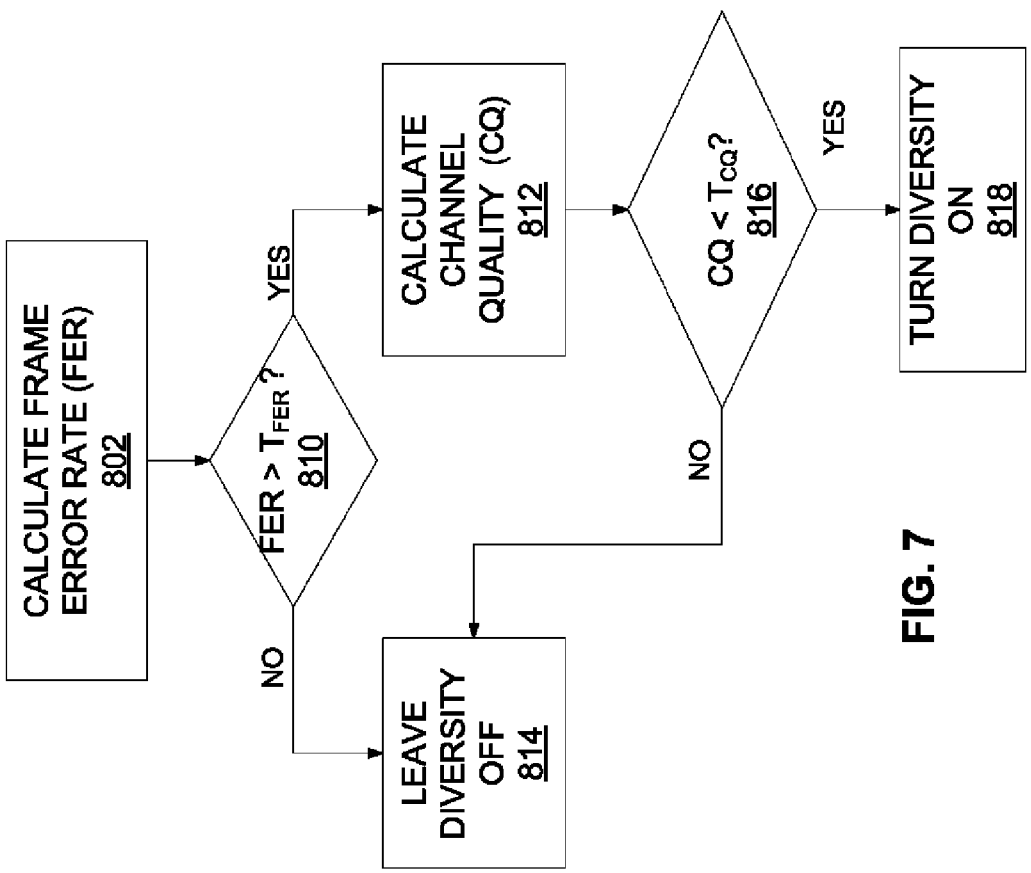
FIG. 7 illustrates one embodiment that considers multiple indicators to control multi-antenna receive diversity.

FIG. 7 illustrates one embodiment that considers multiple indicators to control multi-antenna receive diversity. The receiver calculates a FER at step 802. The FER may be determined in a time window or using an IIR filter. At decision diamond 810, the receiver determines if the FER is greater than a threshold value, $T_{FER}$. If the measured FER is greater than $T_{FER}$, processing continues to step 812 to calculate the Channel Quality (CQ). At step 816, if the channel quality is less than a threshold, $T_{CQ}$, the receiver turns diversity on at step 818. Returning to decision diamond 810, if the FER is not greater than $T_{FER}$, processing continues to step 814 to turn multi-antenna receive diversity off. In one embodiment, the channel quality measurement is Ec/Io. Alternate embodiments may combine any of a variety of indicators. Such indicators may be presented or evaluated so as to provide effective, timely control of receive diversity.

Figure 8:
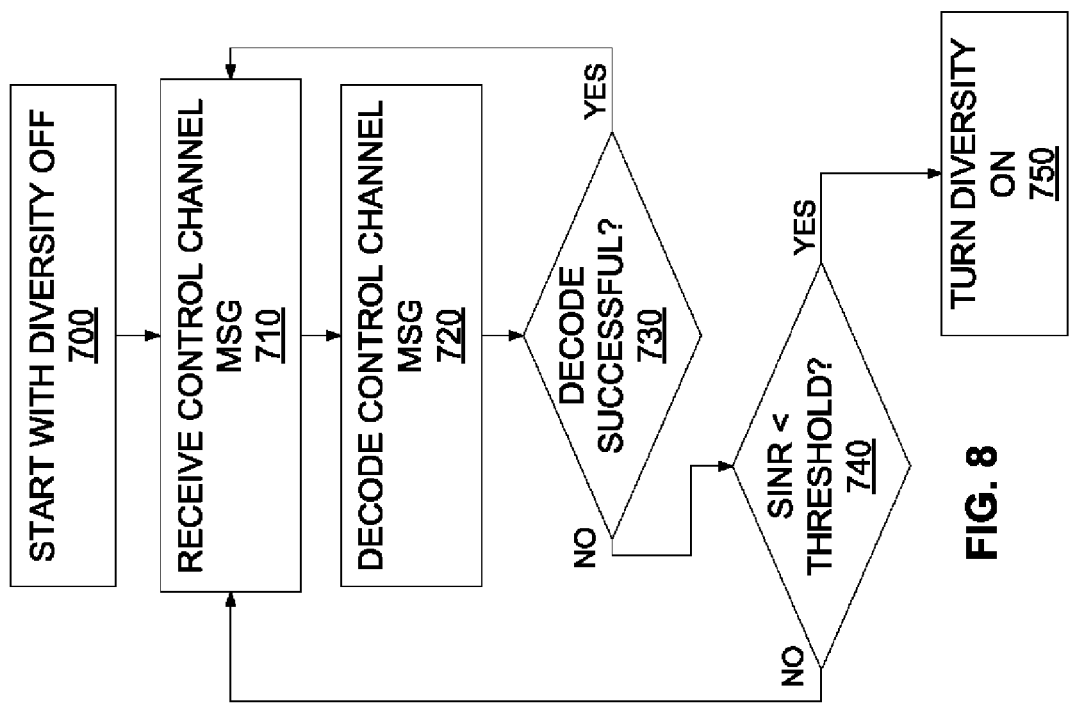
FIG. 8 is a flow diagram illustrating one embodiment of multi-antenna receive diversity control implemented to improve receipt of overhead or control messages.

FIG. 8 is a flow diagram illustrating one embodiment of multi-antenna receive diversity control implemented to improve receipt of overhead or control messages. The process starts with diversity turned off at step 700. The mobile station receives a control message at step 710. The control message is decoded at step 720. If the control message is decoded successfully at decision diamond 730, processing continues to step 710. Else, processing continues to decision diamond 740 to determine if the channel quality is below a threshold. In one embodiment, the channel quality is measured by SINR. If the channel quality is below the threshold at decision diamond 740, processing, at step 750, turns on multi-antenna receive diversity control. Else, processing returns to step 710.

As discussed hereinabove, once multi-antenna receive diversity control is enabled, (i.e., turned on), the mobile station may use a variety of criteria for disabling diversity, including, but not limited to: 1) expiration of a time period, which may be a function of a diversity control indicator; 2) SINR; or 3) a combination thereof.

In a system supporting high packet data rate transmissions, such as a 1x EvDO system supporting the IS-856 specification, receive diversity control may be turned on in the Idle State. Diversity may be kept on for a time period. Such time period may or may not depend on an indicator. Similarly, diversity may remain on until SINR exceeds a higher threshold. Alternately, multi-antenna receive diversity control may be turned on until multiple criteria are satisfied.

In the Connected State, the Mobile Station is in active communication with the base station, and the base station is actively providing power control instructions to the mobile station. In a system supporting IS-856, the Base Station does not alter the power allocated to the mobile station; rather, all of the power of the Base Station is directed to a single mobile station at a given time. Using a diversity enabled mobile, more data may be transferred in a given time period compared to a non-diversity mobile. As a result, the Base Station sector capacity increases when in communication with diversity enabled mobile stations. In bursty traffic applications, such as File Transfer Protocol (FTP) applications or web browser applications, it may not be advantageous to turn diversity off. By turning diversity on, data may be downloaded in a shorter time; faster downloads may reduce the power used to download data. For example, downloading to a non-diversity mobile may take longer and increase transmission power.

On the other hand, if the mobile station is engaged in a constant data rate application, such as a streaming application, it may be beneficial to selectively turn diversity on and off. In such cases, the amount of time it takes to download the content does not decrease by increasing the bandwidth. When the mobile station is running a constant data rate application, receive diversity may be controlled based on instantaneous or filtered version of SINR. Furthermore, when the mobile station determines the channel quality of the forward link, the mobile station uses this information to determine the maximum data rate which may be successfully received at the mobile station on the FL. The mobile station then sends a Data Rate Control (DRC) message to the base station effectively requesting data at this maximum rate. The DRC may be used as an indicator of the forward link channel quality. In one embodiment, the instantaneous DRC values or the IIR filtered version of the DRC values provide an indication of the quality of the forward link, and may be used as a diversity control indicator. Another useful indicator may be the instantaneous DRC values or IIR filtered version of DRC values multiplied by a recent serve rate of the mobile. The resultant product provides an upper bound on data rates supportable by the mobile, wherein diversity may be turned on if the resultant product is less than the data rate required by the constant data rate application plus some margin.

Figure 9:
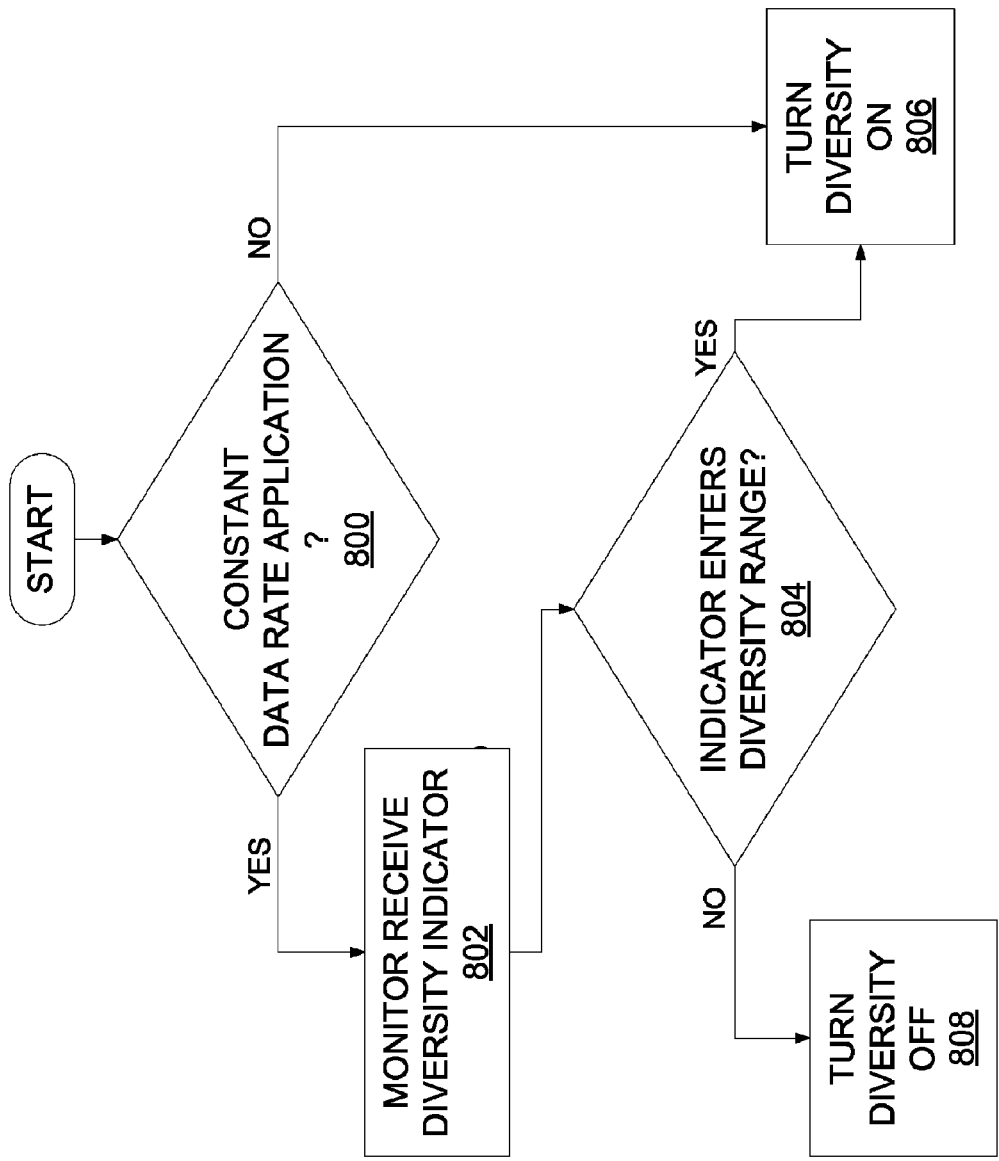
FIG. 9 illustrates an alternate embodiment for diversity control method.

FIG. 9 illustrates an alternate embodiment for a diversity control method. If the mobile station is involved in a constant data rate application at decision diamond 800, processing continues to step 802 to monitor receive diversity indicators. Else, the mobile station enables diversity at step 806. Continuing from step 802, when the mobile station monitors the Multi-antenna Diversity Control (MDC) indicators and detects an indicator value within a diversity control range, at step 804, the mobile station enables diversity at step 806. Else, the mobile station disables diversity at step 808. Indicators used in the Connected State, include, but are not limited to: 1) SINR, instantaneous or IIR filtered; 2) DRC value, instantaneous or IIR filtered; or 3) DRC value scaled by serve rate, wherein the DRC value may be instantaneous or IIR filtered.

In one embodiment, diversity control may enable multi-antenna receive diversity for a minimum time period, without respect to the state of the observed indicators. This would further prevent diversity control from toggling diversity on and off too fast for the system to respond. In other words, there is a time required to turn on diversity or turn off diversity. The minimum time period for maintaining diversity, either on or off, may be constant or may vary depending on one or more of the indicators.

Still other embodiments of diversity control may be used in systems supporting other specifications, such as the 1x EvDV mode of cdma2000 for providing high-speed data transfer. With 1x EvDV specifically, the mobile station may engage in high-speed data transfer, while in voice communication. The mobile station may be assigned one or more of the following channels:

Packet Data Channel (F_PDCH)
Packet Data Control channel (F_PDCCH)
The following indicators may be used to control receive diversity:
Frame errors or FER of the F_PDCH.
Frame errors or FER of the F_PDCCH.

Symbol error rate of the F_PDCH or F_PDCCH.

The above description presents methods and apparatus for controlling multi-antenna receive diversity in a wireless device. Diversity may be controlled in response to operating conditions, transmission requirements, and control settings. Selectively enabling diversity allows the receiver to benefit from multi-antenna receive diversity, while avoiding the extra power incurred when diversity is not necessary for enhanced performance. Operating conditions, transmission requirements, and control settings are used separately and used in conjunction to determine whether benefits of mobile multi-antenna receive diversity, such as higher link capacity, higher data throughput, lower transmit power, and lower error rate warrant the higher power cost of enabling diversity.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a Compact Disc Read-Only Memory (CD-ROM), or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling receive diversity in a wireless communication system comprising:
    enabling a multi-antenna receive diversity mode;
    processing a plurality of received signals with the enabled multi-antenna receive diversity mode;
    receiving a mobile battery level indicator;
    setting a first threshold based on the mobile battery level indicator;
    receiving one or more pilots;
    determining a number of pilots, the number of pilots corresponding to a quantity of the one or more pilots received;
    adjusting the first threshold based on the number of pilots; and
    using the first threshold to either maintain the enabled multi-antenna receive diversity mode or to disable the multi-antenna receive diversity mode.

2. The method of claim 1 further comprising using a second threshold, different from the first threshold, to either maintain the enabled multi-antenna receive diversity mode or to disable the multi-antenna receive diversity mode.

3. The method of claim 2 wherein the second threshold is based on a frame error rate (FER) of a traffic connection.

4. The method of claim 2 wherein the second threshold is based on an infinite impulse response (IIR) filter of a frame error rate (FER).

5. The method of claim 2 wherein the second threshold is based on a quality indicator that comprises at least one quality of service requirement.

6. The method of claim 2 wherein the second threshold is based on an estimate of a ratio of energy of a pilot to energy of an interference.

7. The method of claim 2 wherein the second threshold is based on an estimate of a ratio of energy of a pilot to energy of noise.

8. A method for controlling receive diversity in a wireless communication system comprising:
    enabling a multi-antenna receive diversity mode;
    processing a plurality of received signals with the enabled multi-antenna receive diversity mode;
    receiving one or more pilots;
    determining a number of pilots, the number of pilots corresponding to a quantity of the one or more pilots received;
    adjusting a first threshold based on the number of pilots; and
    using the first threshold to either maintain the enabled multi-antenna receive diversity mode or to disable the multi-antenna receive diversity mode.

9. The method of claim 8 further comprising:
    receiving a mobile battery level indicator;
    setting a first threshold based on the mobile battery level indicator; and using a second threshold in conjunction with the first threshold to either maintain the enabled multi-antenna receive diversity mode or to disable the multi-antenna receive diversity mode, wherein the second threshold is based on one or more of the following:
a frame error rate (FER) for traffic connection and energy per chip per interference density (Ec/Io) measurements, an estimate of a ratio of noise power to reference channel power or received power.

10. The method of claim 8 wherein the first threshold is based on a quality indicator that measures performance of a traffic link in the wireless communication system.

11. An apparatus for controlling receive diversity in a wireless communication system comprising:
a receiver for receiving one or more pilots;
a multi-antenna received diversity unit for
enabling a multi-antenna receive diversity mode;
processing a plurality of received signals with the enabled multi-antenna receive diversity mode; and
a diversity control unit for
receiving a mobile battery level indicator;
setting a first threshold based on the mobile battery level indicator;
determining a number of pilots, the number of pilots corresponding to a quantity of the one or more pilots received;
adjusting the first threshold based on the number of pilots; and
using the first threshold to either maintain the enabled multi-antenna receive diversity mode or to disable the multi-antenna receive diversity mode.

12. The apparatus of claim 11 wherein the diversity control unit also uses a second threshold, different from the first threshold, to either maintain the enabled multi-antenna receive diversity mode or to disable the multi-antenna receive diversity mode.

13. The apparatus of claim 12 wherein the second threshold is based on a frame error rate (FER) of a traffic connection.

14. The apparatus of claim 12 wherein the second threshold is based on an infinite impulse response (IIR) filter of a frame error rate (FER).

15. The apparatus of claim 12 wherein the second threshold is based on a quality indicator that comprises at least one quality of service requirement.

16. The apparatus of claim 12 wherein the second threshold is based on an estimate of a ratio of energy of a pilot to energy of an interference.

17. The apparatus of claim 12 wherein the second threshold is based on an estimate of a ratio of energy of a pilot to energy of noise.

18. An apparatus for controlling receive diversity in a wireless communication system comprising:
a receiver for receiving one or more pilots;
a multi-antenna received diversity unit for
enabling a multi-antenna receive diversity mode; and
processing a plurality of received signals with the enabled multi-antenna receive diversity mode; and
a diversity control unit for
determining a number of pilots, the number of pilots corresponding to a quantity of the one or more pilots received;
adjusting a first threshold based on the number of pilots; and
using the first threshold to either maintain the enabled multi-antenna receive diversity mode or to disable the multi-antenna receive diversity mode.

19. The apparatus of claim 18 wherein the diversity control unit is also for
receiving a mobile battery level indicator; setting a first threshold based on the mobile battery level indicator; and
using a second threshold in conjunction with the first threshold to either maintain the enabled multi-antenna receive diversity mode or to disable the multi-antenna receive diversity mode, wherein the second threshold is based on one or more of the following:
a frame error rate (FER) for traffic connection and energy per chip per interference density (Ec/Io) measurements, an estimate of a ratio of noise power to reference channel power or received power.

20. The apparatus of claim 18 wherein the first threshold is based on a quality indicator that measures performance of a traffic link in the wireless communication system.

21. An apparatus for controlling receive diversity in a wireless communication system comprising:
means for enabling a multi-antenna receive diversity mode;
means for processing a plurality of received signals with the enabled multi-antenna receive diversity mode;
means for receiving a mobile battery level indicator;
means for setting a first threshold based on the mobile battery level indicator;
means for receiving one or more pilots;
means for determining a number of pilots, the number of pilots corresponding to a quantity of the one or more pilots received;
means for adjusting the first threshold based on the number of pilots; and
means for using the first threshold to either maintain the enabled multi-antenna receive diversity mode or to disable the multi-antenna receive diversity mode.

22. The apparatus of claim 21 further comprising means for using a second threshold, different from the first threshold, to either maintain the enabled multi-antenna receive diversity mode or to disable the multi-antenna receive diversity mode.

23. The apparatus of claim 22 wherein the second threshold is based on a frame error rate (FER) of a traffic connection.

24. The apparatus of claim 22 wherein the second threshold is based on an infinite impulse response (IIR) filter of a frame error rate (FER).

25. The apparatus of claim 22 wherein the second threshold is based on a quality indicator that comprises at least one quality of service requirement.

26. The apparatus of claim 22 wherein the second threshold is based on an estimate of a ratio of energy of a pilot to energy of an interference.

27. The apparatus of claim 22 wherein the second threshold is based on an estimate of a ratio of energy of a pilot to energy of noise.

28. An apparatus for controlling receive diversity in a wireless communication system comprising:
means for enabling a multi-antenna receive diversity mode;
means for processing a plurality of received signals with the enabled multi-antenna receive diversity mode;
means for receiving one or more pilots;
means for determining a number of pilots, the number of pilots corresponding to a quantity of the one or more pilots received;
means for adjusting a first threshold based on the number of pilots; and means for using the first threshold to either maintain the enabled multi-antenna receive diversity mode or to disable the multi-antenna receive diversity mode.

29. The apparatus of claim 28 further comprising:
means for receiving a mobile battery level indicator;
means for setting a first threshold based on the mobile battery level indicator; and
means for using a second threshold in conjunction with the first threshold to either maintain the enabled multi-antenna receive diversity mode or to disable the multi-antenna receive diversity mode, wherein the second threshold is based on one or more of the following:
a frame error rate (FER) for traffic connection and energy per chip per interference density (Ec/Io) measurements, an estimate of a ratio of noise power to reference channel power or received power.

30. The apparatus of claim 28 wherein the first threshold is based on a quality indicator that measures performance of a traffic link in the wireless communication system.

31. A non-transitory computer-readable medium storing a computer program, wherein execution of the computer program is for:
enabling a multi-antenna receive diversity mode;
processing a plurality of received signals with the enabled multi-antenna receive diversity mode;
receiving a mobile battery level indicator;
setting a first threshold based on the mobile battery level indicator;
receiving one or more pilots;
determining a number of pilots, the number of pilots corresponding to a quantity of the one or more pilots received;
adjusting the first threshold based on the number of pilots; and
using the first threshold to either maintain the enabled multi-antenna receive diversity mode or to disable the multi-antenna receive diversity mode.

32. The non-transitory computer-readable medium of claim 31 wherein execution of the computer program is also for using a second threshold, different from the first threshold, to either maintain the enabled multi-antenna receive diversity mode or to disable the multi-antenna receive diversity mode.

33. The non-transitory computer-readable medium of claim 32 wherein the second threshold is based on a frame error rate (FER) of a traffic connection.

34. The non-transitory computer-readable medium of claim 32 wherein the second threshold is based on an infinite impulse response (IIR) filter of a frame error rate (FER).

35. The non-transitory computer-readable medium of claim 32 wherein the second threshold is based on a quality indicator that comprises at least one quality of service requirement.

36. The non-transitory computer-readable medium of claim 32 wherein the second threshold is based on an estimate of a ratio of energy of a pilot to energy of an interference.

37. The non-transitory computer-readable medium of claim 32 wherein the second threshold is based on an estimate of a ratio of energy of a pilot to energy of noise.

38. A non-transitory computer-readable medium storing a computer program, wherein execution of the computer program is for:
enabling a multi-antenna receive diversity mode;
processing a plurality of received signals with the enabled multi-antenna receive diversity mode;
receiving one or more pilots;
determining a number of pilots, the number of pilots corresponding to a quantity of the one or more pilots received;
adjusting a first threshold based on the number of pilots; and
using the first threshold to either maintain the enabled multi-antenna receive diversity mode or to disable the multi-antenna receive diversity mode.

39. The non-transitory computer-readable medium of claim 38 wherein execution of the computer program is also for:
receiving a mobile battery level indicator;
setting a first threshold based on the mobile battery level indicator; and
using a second threshold in conjunction with the first threshold to either maintain the enabled multi-antenna receive diversity mode or to disable the multi-antenna receive diversity mode, wherein the second threshold is based on one or more of the following:
a frame error rate (FER) for traffic connection and energy per chip per interference density (Ec/Io) measurements, an estimate of a ratio of noise power to reference channel power or received power.

40. The non-transitory computer-readable medium of claim 38 wherein the first threshold is based on a quality indicator that measures performance of a traffic link in the wireless communication system.

\* \* \* \* \*